US010341686B2

(12) United States Patent
Ducloux

(10) Patent No.: US 10,341,686 B2
(45) Date of Patent: Jul. 2, 2019

(54) METHOD FOR DYNAMICALLY ADAPTING THE ENCODING OF AN AUDIO AND/OR VIDEO STREAM TRANSMITTED TO A DEVICE

(71) Applicant: Harmonic, Inc., San Jose, CA (US)

(72) Inventor: Xavier Ducloux, Rennes (FR)

(73) Assignee: Harmonic, Inc., San Jose, CA (US)

( * ) Notice: Subject to any disclaimer, the term of this patent is extended or adjusted under 35 U.S.C. 154(b) by 275 days.

(21) Appl. No.: 14/651,772

(22) PCT Filed: Dec. 12, 2013

(86) PCT No.: PCT/EP2013/076397
§ 371 (c)(1),
(2) Date: Jun. 12, 2015

(87) PCT Pub. No.: WO2014/090950
PCT Pub. Date: Jun. 19, 2014

(65) Prior Publication Data
US 2015/0326887 A1  Nov. 12, 2015

(30) Foreign Application Priority Data
Dec. 12, 2012  (FR) ..................................... 12 61932

(51) Int. Cl.
*H04N 11/02* (2006.01)
*H04N 19/85* (2014.01)
(Continued)

(52) U.S. Cl.
CPC ........... *H04N 19/85* (2014.11); *H04N 19/107* (2014.11); *H04N 19/117* (2014.11);
(Continued)

(58) Field of Classification Search
CPC ..................................................... H04N 19/85
(Continued)

(56) References Cited

U.S. PATENT DOCUMENTS 7,466,367 B2 * 12/2008 DaCosta .............. H04N 5/4401
  348/552
7,649,898 B1 * 1/2010 May, Jr. .............. H04M 7/0039
  370/401

(Continued)

FOREIGN PATENT DOCUMENTS

WO  2006080261 A2  8/2006

OTHER PUBLICATIONS

X. Ducloux et al., "Thomson Video Networks, Response to the Call for Proposals on Green MPEG", 105. MPEG Meeting: Jul. 29, 2013-Aug. 2, 2013.

(Continued)

*Primary Examiner* — Leron Beck
(74) *Attorney, Agent, or Firm* — Brokaw Patent Law PC; Christopher J. Brokaw

(57) ABSTRACT

The present invention concerns a method for dynamically adapting the lossy encoding of an audio and/or video stream (112) transmitted by a first device (101) to a remote device (102), said method comprising the following steps: the remote device (102) receives and decodes said stream (112), called the incoming stream, and transmits an outgoing stream (111) having at least one indicator relating to a state of said remote device (102) that is modified by the execution of the decoding of the incoming stream (112); the first device (101) receives the outgoing stream (111), extracts said at least one indicator therefrom and adapts the encoding of the incoming stream (112) according to said at least one extracted indicator. The method can be applied notably to video conferences conducted on the basis of self-powered terminals for the purpose of maintaining the operating period of these terminals.

16 Claims, 1 Drawing Sheet

(51) Int. Cl.
*H04N 19/176* (2014.01)
*H04N 19/46* (2014.01)
*H04N 19/61* (2014.01)
*H04N 19/107* (2014.01)
*H04N 19/117* (2014.01)
*H04N 19/124* (2014.01)
*H04N 19/132* (2014.01)
*H04N 19/156* (2014.01)
*H04N 19/164* (2014.01)
*H04N 19/70* (2014.01)

(52) U.S. Cl.
CPC ......... *H04N 19/124* (2014.11); *H04N 19/132* (2014.11); *H04N 19/156* (2014.11); *H04N 19/164* (2014.11); *H04N 19/176* (2014.11); *H04N 19/46* (2014.11); *H04N 19/61* (2014.11); *H04N 19/70* (2014.11)

(58) Field of Classification Search
USPC ........................................ 375/240.01–240.29
See application file for complete search history.

(56) References Cited

U.S. PATENT DOCUMENTS

| | | | | |
|---|---|---|---|---|
| 8,416,848 | B2* | 4/2013 | Gordon | H04N 7/1675 375/240.02 |
| 8,560,753 | B1* | 10/2013 | Hobbs | G06F 3/1454 345/2.1 |
| 9,106,887 | B1* | 8/2015 | Owen | H04N 19/102 |
| 9,326,249 | B2* | 4/2016 | Ha | H04W 52/029 |
| 2005/0058057 | A1* | 3/2005 | Maltsev | H04L 5/006 370/203 |
| 2008/0062018 | A1 | 3/2008 | Normile et al. | |
| 2008/0084491 | A1 | 4/2008 | He et al. | |
| 2008/0192822 | A1* | 8/2008 | Chang | H04N 19/172 375/240.03 |
| 2009/0061954 | A1 | 3/2009 | Syed | |
| 2009/0074084 | A1* | 3/2009 | Drezner | H04N 19/139 375/240.29 |
| 2011/0113269 | A1* | 5/2011 | Park | G06F 1/3203 713/310 |
| 2011/0222623 | A1* | 9/2011 | Hollis | H04L 25/0278 375/295 |
| 2012/0057646 | A1* | 3/2012 | Jovicic | G01S 5/0289 375/295 |
| 2012/0189083 | A1* | 7/2012 | Reial | H04B 1/123 375/340 |
| 2012/0288043 | A1* | 11/2012 | Chen | H04B 1/109 375/345 |
| 2013/0083843 | A1* | 4/2013 | Bennett | H04N 19/12 375/240.02 |
| 2014/0010282 | A1* | 1/2014 | He | H04N 21/23439 375/240.02 |

OTHER PUBLICATIONS

"Preliminary WD of Green MPEG", 105, MPEG Meeting; Jul. 29, 2013-Aug. 2, 2013.
International Search Report, dated Mar. 21, 2014.

* cited by examiner

METHOD FOR DYNAMICALLY ADAPTING THE ENCODING OF AN AUDIO AND/OR VIDEO STREAM TRANSMITTED TO A DEVICE

FIELD OF THE INVENTION

The present invention concerns a method for dynamically adapting the encoding of an audio and/or video stream transmitted to a device. The method can be implemented in apparatuses interchanging encoded audio and/or video streams in real time with the aim of adapting the encoding of a stream to variable constraints peculiar to the apparatus receiving these streams. It can be applied notably to video conferences conducted on the basis of self-powered terminals for the purpose of maintaining the operating period of these terminals.

BACKGROUND OF THE INVENTION

The rapid development in the capabilities of wireless communication apparatuses means that it is now possible to carry out video communications in real time on the basis of mobile terminals with a satisfactory level of quality.

In order to maintain reasonable bitrate requirements for the transmission of these streams on network infrastructures, these video streams are generally compression encoded and therefore require decoding by the receiver of these streams. This decoding generally constitutes, among other elements, an operation that is demanding in terms of computation resources and hence power consumption.

Techniques have been proposed to reduce the power consumption of a terminal that needs to perform stream decoding. Notably, the company Samsung Electronics Co. Ltd has proposed, during MPEG—Motion Picture Experts Group—standardization meetings in Geneva in April 2012 and Stockholm in July 2012, a solution based on what is known as the DVFS "Dynamic Voltage Frequency Scaling" technique, a technique that is implemented in numerous computation chips. DVFS involves reducing the clock frequency of the chip by decreasing the voltage that is applied thereto; the consumption of this chip is then reduced. Conventionally, this decrease in the voltage is triggered in response to the finding, in view of the recent images transmitted in the received stream, that the chip has a power margin for carrying out decoding of this stream and that it is therefore possible to decrease its computation power without affecting the correct execution of the decoding. Moreover, the company Samsung Electronics Co. Ltd proposes improving this method by transmitting to the stream receiver one or more metadata providing an indication of the complexity of decoding of the stream, this indication allowing the apparatus receiving the stream to better adjust the power of the chip used for decoding this stream.

This technique can nevertheless prove inadequate in certain situations, so much so that communication can be suddenly interrupted because the apparatus performing the decoding has exhausted its power reserves.

SUMMARY OF THE INVENTION

An aim of the invention is notably optimum use of the resources of a stream decoding apparatus. To this end, the subject matter of the invention is a method for dynamically adapting the lossy encoding of an audio and/or video stream transmitted by a first device to a remote device, said method being characterized in that it comprises the following steps:

the remote device receives and decodes said audio and/or video stream, called the incoming stream, and transmits an outgoing stream from the remote device, said outgoing stream having at least one indicator translating a level of power saving or power saving rate desired by said remote device, said indicator corresponding to a level of reduction or education rate in decoding operations for the stream or in processor P processing cycles the first device receives the outgoing stream from the remote device, extracts said at least one indicator therefrom and adapts the encoding of the incoming stream into the remote device according to said at least one extracted indicator.

The method according to the invention thus allows dynamic adaptation of the characteristics of an encoded stream according to the constraints associated with the remote apparatus that is responsible for decoding this stream. Advantageously, the incoming stream is transmitted in real time. It may be noted that the state of the remote device that is modified by the execution of the decoding of the incoming stream can likewise be modified by the encoding of the outgoing stream, when the latter is an encoded stream.

According to one implementation of the method according to the invention, the remote device comprises dedicated power supply and energy storage means, and means for measuring the power consumed and for calculating the level of power saving, the first device modifying the encoding characteristics of the incoming stream according to the value of said at least one indicator so as to reduce the power consumed by the remote device for decoding said incoming stream. By way of example, the first device can reduce the complexity of the encoded incoming stream, so that the remote device has a power margin for decoding this stream. The computation means on this remote device, for example a microprocessor, can then be the subject of a reduction of the clock frequency, a decrease in the voltage that is applied thereto, thus allowing a reduction in the consumption of the remote device.

According to a variant, in order to translate the desired level of power saving into a level of reduction in the number of operations/cycles per second, the method uses the relationship of operating frequency or number of operations/cycles per second as a function of power supply voltage and the relationship of power consumption as a function of the power supply voltage of the device.

The remote device can insert into the outgoing stream one or more metadata comprising at least one of said indicators, the first device extracting said indicator from said metadata before carrying out the adapted encoding of the incoming stream.

According to one implementation of the method for dynamically adapting according to the invention, the remote device inserts into the outgoing stream metadata comprising at least one indicator from among: the level of charge of said energy storage means, the change in said level of charge over time, and the swiftness of said change over time, the first device modifying the encoding characteristics of the incoming stream according to the value of at least one of said indicators so as to reduce the power consumed by the remote device for decoding said incoming stream. By way of example, if the remote device comprises an electrical storage battery, it can modify the encoding of the stream according to the level of charge of this storage battery. The method can likewise be applied to a remote device powered by other means, such as solar panels or any other means that is capable of no longer meeting the energy needs of the device for reasons linked to the environment of the device.

By way of example, if the second device comprises photovoltaic panels, the remote device can modify the encoding of the incoming stream as a function of the level of luminosity to which said panels are exposed.

According to one implementation of the method for dynamically adapting according to the invention, the outgoing stream is a video stream encoded on the basis of the "MPEG4-Advanced Video Coding" standard or a standard with upward compatibility with this standard, the remote device inserting said at least one indicator into a message of "Supplemental Enhancement Information" type associated with a plurality of the images of the outgoing stream.

According to one implementation of the method for dynamically adapting according to the invention, the remote device applies different encoding parameters for the outgoing stream according to the state of the remote device, the first device determining the indicator(s) for adaptation of the encoding of the incoming stream on the basis of the encoding characteristics of the outgoing stream. This implementation of the method according to the invention bears witness to the possibly implicit nature of an indicator: the latter is not explicitly transmitted by metadata, but rather by encoding characteristics. It is actually possible to see the modifications of the characteristics of the encoded stream as a communication channel. By way of example, if the remote device is equipped with a module for adapting the complexity of encoding of the stream according to its own battery level, it decreases the complexity of encoding of the outgoing stream when the level of charge in the battery decreases below a predetermined threshold. This change of complexity is perceived by the first device, which is then configured to interpret this change as an indication to the first device to encode the incoming stream so as to minimize the decoding power used by the remote device. In other words, the change of complexity is considered by the first device to be an indicator aimed at alleviating the decoding responsibility weighing on the remote device. By way of example, a lower resolution of the outgoing stream can be interpreted by the first device to be a signal to produce an encoded incoming stream of lesser resolution than for the remote device.

The first device can likewise comprise dedicated power supply and energy storage means, the first device modifying the encoding characteristics of the incoming stream according to, jointly, the value of said at least one indicator and the level of charge of the energy storage means of the first device.

According to one implementation of the method for dynamically adapting according to the invention, the encoding of the incoming stream by the first device comprises compression encoding comprising a step of cutting the images into blocks, and for each block, a transform and a quantification, the first device modifying, according to the indicator(s) of the outgoing stream, at least one parameter from among the fineness of cutting of the images into blocks, the relative proportion of blocks with spatial predictive encoding in relation to the number of blocks with temporal predictive encoding, the level of quantification.

The encoding of the incoming stream by the first device can comprise filtration preprocessing and then compression encoding on the preprocessed stream, the first device modifying, according to the indicator(s) of the outgoing stream, at least one parameter from among the intensity of said preprocessing filter, the level of compression of the encoding, the resolution of the incoming stream. Corrective action on the encoding of the incoming stream can thus be taken on a plurality of levels.

The subject matter of the invention is likewise an encoding device for audio and/or video streams, said device being configured to implement the steps of the method for dynamically adapting as described above that are executed by the first device. By way of example, the encoding device is a mobile communication terminal provided with encoding and decoding means that make it capable, by way of example, of video conferencing.

The subject matter of the invention is likewise a decoding device for audio and/or video streams, said device being configured to implement the steps of the method for dynamically adapting as described above that are executed by the remote device.

The subject matter of the invention is likewise an encoding and decoding device for audio and/or video streams, the device being capable of alternately implementing the steps executed by the first device in the method for dynamically adapting as described above and the steps executed by the remote device in the same method.

The subject matter of the invention is likewise a system for communication by audio and/or video streams comprising an encoding device as described above with a decoding device as described above, the encoding device dynamically adapting the encoding of the stream transmitted to the decoding device according to a state of the decoding device.

The system for communication according to the invention, in which the first device and the remote device are each an encoding and decoding device as described above, these devices being capable of interchanging streams whose encoding performed locally on each of the two devices is dynamically adapted according to the constraints associated with the other device.

BRIEF DESCRIPTION OF THE DRAWINGS

Other features will emerge upon reading the detailed description, which is provided by way of example and nonlimiting, that follows with reference to the appended drawings, in which.

MORE DETAILED DESCRIPTION

Figure 1:
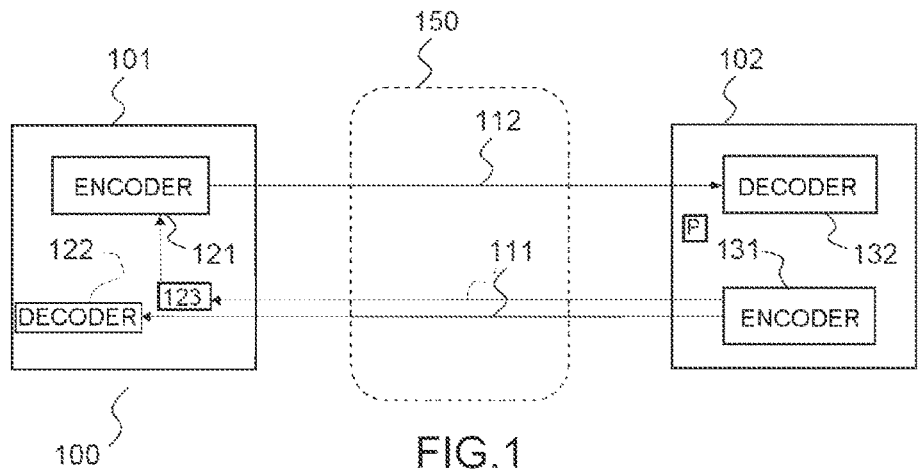
FIG. 1 shows a schematic illustration of a system implementing a method example according to the invention.

FIG. 1 shows an illustrative diagram of a system implementing a method example according to the invention.

The system 100 comprises a first device 101 and a second device 102 that are adapted to interchanging video streams 111, 112. By way of example, these devices 101, 102 are mobile terminals used for video conference communication. Each of the devices thus comprises forming means (image sensor) and video encoding and decoding means in order to transmit data of small size over the network infrastructure 150 (for example a cellular communication network) that separates them. The encoder 121 of the first device 101 produces an encoded video stream 112 that is transmitted to the decoder 132 of the second device 102. Moreover, in the example, the encoder 131 of the second device 102 produces an encoded video stream 111 that is transmitted to the decoder 122 of the first device 101. The encoded video stream 111 is also transmitted to an extraction module 123 for an indicator 312 translating a level of power saving. The extraction module may be part of the decoder 122.

These terminals 101, 102 being mobile, they are autonomous from the point of view of power; in the example, they each have a rechargeable electrical battery (not shown in the figure). Moreover, the second device 102 advantageously comprises a gage to determine the level of charge in its battery. According to one implementation of the method according to the invention, the second device 102 transmits this level of charge in the encoded stream 111 that it produces, called the first stream 111.

According to a first embodiment, the first device 101 receives this first stream 111, decodes it and extracts therefrom the information about the level of charge in the battery of the second device 102. The first device 101 then uses this information to check the characteristics, the parameters of the encoding of the second stream 112, the one that is produced by the encoder 121 of the first device 101. The reason is that if the second device 102 indicates to the first device 101 that its battery level is low, it is desirable to provide the second device 102 with a second stream 112 that can be decoded without requiring the consumption of a large amount of power, the remaining operating period being linked to the level of charge. The complexity of the encoding of the second stream 112 can therefore be adjusted by taking account of state parameters peculiar to the remote device 102, such as its battery level.

By virtue of the method according to the invention, the first device 101 produces a second encoded stream 112 that is better adapted to the constraints to which the device 102 is subjected, that is to say adapted to the level of charge in its battery in the example. When it receives a second stream 112 for which the decoding is simplified, the second device 102 can, by way of example, decrease the voltage applied to its computation processor P that is responsible for decoding the stream 112, and can thus reduce the power consumption required in order to decode the received stream 112. The second device 102 can thus extend its operating period. The method according to the invention forms a loop comprising a phase of providing the encoding device with information, a phase of parameterized encoding using the transmitted information, and then a phase of decoding; this loop can be repeated over time so as to provide a function of dynamic adaptation to the state and/or to the environment of the decoding device.

Advantageously, metadata are likewise inserted into this second stream 112 in order to provide the second device 102 with an indication of the level of complexity required for decoding this stream 112, so as to facilitate the adjustment of the power of the computation chip assigned to decoding.

Symmetrically, the method according to the invention can likewise be implemented in order to reduce the amount of power used to decode the first stream 111 received by the first device 101, so that the encoder 131 of the second device 102 takes account of an indicator transmitted in the second stream 112 in order to adjust the encoding of the first stream 111 and thus to alleviate the computation responsibility linked to decoding of this first stream 111 via the first device 101.

Each of the devices 101, 102 can thus indirectly control the dynamic adaptation of its computational load for decoding according to the battery level that it has.

According to another embodiment, the device 101 is adapted to taking account of the level of power saving desired by the device 102 in relation to its current consumption on the basis of the second transmitted stream 112. To this end, the device 102 is adapted, by way of example, to translating the desired level of power saving (or power saving rate) into a level of reduction in operations or in processor processing cycles by using, by way of example, the relationship of operating frequency of the processor or number of operations/cycles per second as a function of the power supply voltage and the relationship of power consumption as a function of the power supply voltage, which is specific to this device. The level of reduction in processor processing operations or cycles being independent of the processor type, this means that the reduction in decoding operations that is estimated by the processor of the device 101, when it acts on the stream 112, will be very valid for the processor of the device 102, even if it is of a different nature than the processor of the device 101. In order to translate the level of saving, the method will notably use the chart for power consumption as a function of the power supply voltage of the processor and the chart for power supply voltage as a function of the operating frequency of the processor. There is a direct relationship between the number of processing operations or cycles and the operating frequency of the processor. The device 101 will then modify the stream 112 according to steps described further on in the description. In this example, it is the level of reduction in decoding operations for the stream 112 that constitutes the indicator 312 placed in the stream 111.

In this implementation variant, the device 101 comprises an extraction module for the request or metadatum that receives the stream 111 at the input and that generates the indicator 312 at the output, translating a request bound for an encoder in order to generate a stream that allows power to be saved. In this example, the indicator 312 expresses a reduction rate or level of reduction in decoding operations. The device 101 can use the indicator directly and therefore no longer has to use charts.

If the indicator is an energy saving rate, this is a case in which the device 101 uses charts to convert the request into a datum that can be used for its own sake.

Figure 2:
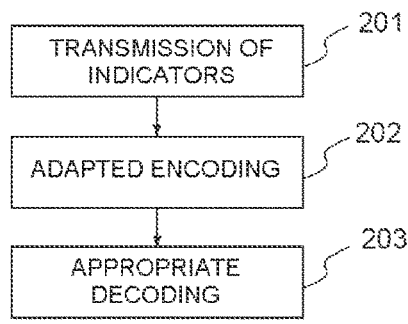
FIG. 2 shows an overview illustrating the steps of a method example according to the invention.

FIG. 2 illustrates the steps of a method example according to the invention. The method can be implemented on the system described above with reference to FIG. 1.

In a first step 201, the second device 102 transmits a first encoded stream 111 having at least one indicator relating to the state or to the environment of this second device 102. The transmitted indicators can comprise the level of charge of energy storage means, such as a battery. Although the level of charge of a battery is transmitted in the example used, other indicators can be provided for the first device 101 so that it checks the characteristics of the encoded stream 112 transmitted to the second device 102. Equally, a plurality of indicators can be used jointly. By way of example, an indicator concerning an evoluation in the charge of the battery can be used so that if the battery is at a low charge level but this level rises again because the second device 102 is connected to an external power source, the first device 101 can take account of this so as not to excessively lower the quality of the second stream 112 that is produced. In some special situations, the indicators can likewise relate to the environment in which the second device 102 is situated, for example climatic data such as the temperature or any other element that can possibly affect the operation of the device 102, and more particularly its power consumption.

In the second example that is used, the transmitted indicator combines the previous parameters and the preferences of the user in terms of length of service in order to derive therefrom a level of power saving, or even a level of reduction in decoding operations that is directly usable by the device 101.

Moreover, an indicator can directly represent an encoding parameter or a predefined encoding mode to be applied by the first device 101 for encoding the second stream 112.

The indicator or the indicators can be transmitted by metadata that are inserted in the first stream 111. By way of example, in the case of encoding of a video stream of MPEG4-AVC "Motion Picture Experts Group 4—Advanced Video Codec" type, the indicator can be inserted into an SEI "Supplemental Enhancement Information" message, to each image in the stream 111 or according to a cycle with a longer period.

The indicators can likewise be transmitted by other means. Notably, the encoding characteristics of the first stream 111 themselves can constitute an indicator. By way of example, if the resolution of the encoded stream 111 has decreased, the first device 101 can interpret this change of resolution as a need for power saving on the part of the second device 102. This is because the level of charge in the battery of the second device 102 may be low, so that its encoder 131 is commanded to decrease the complexity of encoding for the first stream 111 that it produces. This decrease in complexity can be interpreted by the first device 101 as an indicator that needs to be used in order to itself modify the parameters of its encoder 121.

The indicators can be transmitted in a signal that is independent of the first stream 111. According to another implementation of the method for dynamically adapting according to the invention, the first stream 111 does not exist and is replaced by a simple information signal bound for the first device 101, said signal having the indicator(s) allowing the first device 101 to adapt its encoding.

In a second step 202, the first device 101 receives and decodes the first stream 111, extracts therefrom the indicator(s) present in the stream 111, and encodes and produces the second stream 112, the encoding of which is adjusted according to the extracted indicator(s). When an indicator is present in the form of metadata, for example a message of SEI type that is present in an MPEG4-AVC stream, the second device 102 extracts/reads this indicator from the SEI message. The first device 102 can likewise be configured to extract implicit indicators, in other words indicators that are present in the form of encoding characteristics of the first stream 111. By way of example, the resolution of the first stream 111 can be considered to be an indicator. When all the indicators have been identified, the first device 101 determines the encoding parameters, and encodes and transmits the second stream 112. Multiple actions, which are set out further on with reference to FIG. 2, can be taken in order to adapt the encoding of the second stream 112 to the constraints of the decoding device 102.

In a third step 203, the second device 102 receives and decodes the second stream 112. By virtue of the parameterization adaptations made during the encoding of the second stream 112 via the first device 101, the decoding of the second stream 112 benefits from an adjustment to the constraints that are linked to the state and/or to the environment of the second device 102. The decoding can be considered to be appropriate to the conditions in which the second device 102 are situated.

Figure 3:
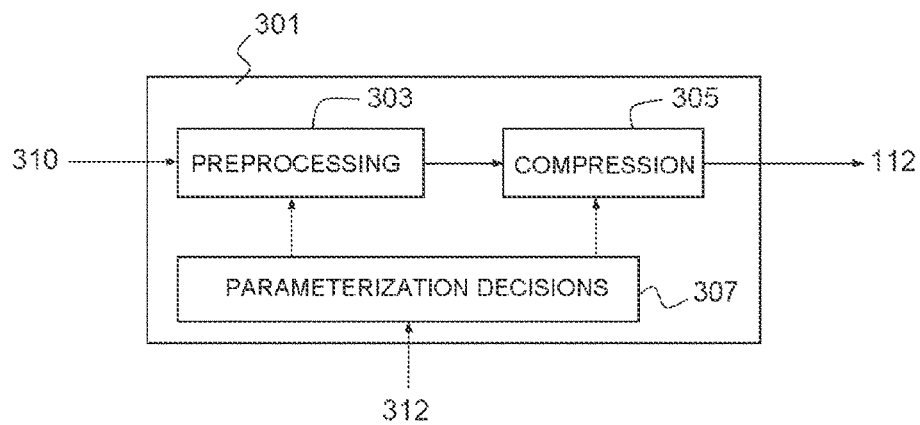
FIG. 3 shows an overview illustrating a method for determining the actions to be performed on an encoded stream in order to decrease its complexity of decoding.

FIG. 3 illustrates a method for determining the actions to be performed on an encoded stream in order to decrease its complexity of decoding. This method can, by way of example, be implemented on the first device 101 illustrated in FIG. 1.

The encoding 301 of the second stream 112 uses the indicators 312 extracted from the first stream 111 in order to encode a source stream 310 from, by way of example, an image sensor that is present on the first device 101. By way of example, the encoding 301 comprises preprocessing 303 and then compression encoding 305. The parameterization of these two steps 303, 305 is checked by a decision module 307 taking account of the indicators 312.

By way of example, the compression encoding 305 implements a block encoding technique such as encoding in the MPEG4-AVC format. This type of technique has notably a step of cutting the images to be encoded into blocks, which blocks are subjected to a transform (often by DCT, discrete cosine transform), a quantification and then entropic encoding. Moreover, some blocks have spatial predictive encoding (often called intra blocks), and others have temporal predictive encoding (inter blocks). Several characteristics of this encoding are parameterizable, notably the quantification or the cutting into blocks, in order to produce an encoded stream that is simpler to decode.

The preprocessing 303 receives a source stream 310 at the input and can execute filtering on the source stream 310 in order to decrease its entropy, for example, and thus to facilitate the compression encoding 305. This can involve a low pass frequency filter, for example. The preprocessing 303 can likewise modify the resolution of the images of the source stream 310, a video of lesser resolution requiring less computation power in order to be decoded.

The decision module 307 acts on the parameters of the preprocessing 303 and of the compression encoding 305 in order to vary the complexity of decoding of the produced stream 112 according to, notably, the indicators 312 that are received. Thus, the decision module 307 can notably parameterize the intensity of the filter(s) applied during the preprocessing, can parameterize the resolution of the video, can parameterize the fineness of cutting of the images into blocks, can parameterize the relative proportion of intra blocks in relation to the number of inter blocks, can parameterize the level of quantification applied during the compression encoding, or any other parameterization that allows the constraints at which the indicators 312 are aimed to be met.

The order in which these parameter modifications are applied and the intensity with which they are applied may be the subject of various strategies. By way of example, there may be a requirement to preserve a predetermined quality for the encoded stream, so that a compromise between the complexity of decoding and the quality of the stream needs to be found.

According to an implementation example for the method according to the invention, when the encoding of a video stream needs to be adapted in order to decrease its complexity of decoding, three adjustments are made gradually, according to the change in the indicators over time, for example according to the decrease in the level of the battery of the remote device 102. Firstly, the intensity of the preprocessing filters is increased; secondly, the compression encoding parameters are modified—for example the level of quantification, the number of blocks is reduced or the encoding characteristics of the blocks are modified—; thirdly, the resolution of the video is decreased. Thus, when the level of the battery decreases but remains above a predetermined threshold, only the first action relating to the preprocessing operations will be performed. These gradual adjustments allow a compromise to be reached between the power saving obtained when decoding the second stream 112 and the perceived quality of this stream. The reason is that, by way of illustration, it may be desirable to increase the levels of quantification for the stream (performed secondly in the example), but up to an acceptable degradation limit for the perceived quality. Beyond that, the resolution of the video is reduced, as envisaged thirdly.

The parameterization decisions taken by the decision module 307 may likewise be dependent on data other than the indicators 312. By way of example, if the supply of power to the first device 101 is dependent on a battery as well, the level of charge in this battery can play a part in the adaptation choices to be applied to the encoding of the second stream 112. On this assumption, it is actually necessary to take account of the level of charge in the local battery (of the first device 101) in order to limit power consumption for encoding the second stream 112, and it is likewise necessary to take account of the level of charge in the remote battery (of the second device 102) in order to limit the power consumption owing to the decoding of this stream 112.

Moreover, among the indicators 312 that are transmitted with the first stream 111, there may feature a user parameter or a parameter linked to the communication service that is being executed. By way of example, the user of the second device 102 can configure a power management policy that influences the adaptation strategy for the coding of the second stream 112. By way of illustration, if the user knows that the service associated with reception of the stream will be of short duration, there is no use in drastically reducing the quality of the stream 112. According to another implementation of the method according to the invention, this power management policy can be defined, not by an indicator 312 that is transmitted in the first stream 111, but rather by means of a message that is transmitted when the communication is set up between the two devices 101, 102.

According to another implementation of the invention, no preprocessing is performed and the source stream 310 is directly processed by compression encoding 305. Moreover, although block encoding of MPEG type is chosen as an illustration, any type of parameterizable compression encoding can be used.

According to one implementation of the invention, the decision module 307 is not present in the encoder 121 of the device that produces the encoder stream, because the indicators 312 are encoding parameters that can be interpreted directly by the preprocessing 303 and/or the compression encoding 305. By way of example, an indicator may be a level of quantification to be applied during MPEG encoding. By way of example, this level has been determined previously by the second device 102 that has transmitted the first stream 111.

According to one implementation of the method according to the invention, when the decision module 307 decides to decrease the resolution of the stream, this resolution is decreased directly at the source of the stream, that is to say that the source stream 310 is of low resolution. By way of example, if the first device 101 has a video camera whose output resolution can be configured, then the decision module 307 transmits a command to this camera so that it produces a stream of lesser resolution. This change constitutes a drastic reduction in the complexity of the stream without requiring any special intervention on the parameterization of the level of the preprocessing 303 or of the compression encoding 305.

The method according to the invention can be implemented in the form of computer programs that are executed by a microprocessor that is present on the first device 101 and on the second device 102, for example. According to another implementation, the functions of the method according to the invention are implemented in the form of circuits, for example programmable circuits of FPGA (Field Programmable Gate Array) type or specific circuits.

The method for dynamically adapting according to the invention can be applied notably to video conferences for which at least one of the participants is connected via a mobile terminal provided with power supply means that are independent and therefore limited. The method can then be implemented in order to dynamically adapt the complexity of the stream encoded by a local terminal according to the environment or the state of charge of the battery of the remote mobile terminal.

The method for dynamically adapting according to the invention can be applied to multiple types of standard definition (SD) or high definition (HD) video streams and to multiple formats such as streams in the MPEG4-AVC (Moving Picture Experts Group 4-Advanced Video Coding, also denoted by H.264), MPEG2 (H.262), HEVC (High Efficiency Video Coding, sometimes denoted by H.265), VP8 (from the company Google Inc.) and DivX HD+ format, or a format having upward compatibility with one of these formats. Upward compatibility with MPEG4-AVC is understood to mean a format for which an encoder of a stream in this format is likewise capable of encoding a stream in the MPEG4-AVC format and/or for which a decoder of a stream in this format is likewise capable of decoding a video in the MPEG4-AVC format. The method for dynamically adapting according to the invention can likewise be applied to other types of streams such as audio streams, or more generally to a stream with lossy encoding.

The invention claimed is:

1. A method for dynamically adapting the lossy encoding of an audio and/or video stream transmitted by a first device to a remote device, comprising:
the remote device (1) receiving, from said first device, said audio and/or video stream, called the incoming stream, (2) decoding the incoming stream received from the first device, and (3) transmitting an outgoing stream from the remote device to the first device,
wherein said outgoing stream comprises at least one indicator translating a power saving rate desired by said remote device, said at least one indicator corresponding to a reduction rate in decoding operations for the incoming stream into the remote device or in processor P processing cycles; and
the first device (1) receiving the outgoing stream from the remote device, (2) extracting said at least one indicator from the outgoing stream, and (3) adapting the encoding of the incoming stream, prior to transmission to the remote device, according to said at least one extracted indicator.

2. The method for dynamically adapting the stream encoding of claim 1, wherein the remote device comprises (a) a dedicated power supply, (b) a device for storing energy, and (c) a device for measuring the power consumed and for calculating the necessary power saving rate, and wherein the first device modifies the encoding characteristics of the incoming stream according to a value of said at least one indicator so as to reduce the power consumed by the remote device for decoding said incoming stream.

3. The method for dynamically adapting the stream encoding of claim 1, further comprising:
translating the desired power saving rate into a reduction in operations/cycles per second, based, at least in part, upon the relationship of operating frequency or number of operations/cycles per second as a function of the power supply voltage and the relationship of power consumption as a function of the power supply voltage of the device.

4. The method for dynamically adapting the stream encoding of claim 1, wherein the remote device inserts into the outgoing stream one or more units of metadata comprising at least one of said indicators, and wherein the first device extracts said indicators from said one or more units of metadata before adapting the encoding of the incoming stream.

5. The method for dynamically adapting the stream encoding of claim 3, wherein the remote device inserts into the outgoing stream metadata that comprises at least one indicator that indicates: the level of charge of an energy storage, the change in said level of charge over time, and the swiftness of said change over time, and wherein the first device modifies the encoding characteristics of the incoming stream according to the value of at least one of said indicators so as to reduce the power consumed by the remote device for decoding said incoming stream.

6. The method for dynamically adapting the stream encoding of claim 4, wherein the outgoing stream is a video stream encoded on the basis of the "MPEG4-Advanced Video Coding" standard or a standard with upward compatibility with this standard, and wherein the remote device inserts said at least one indicator into a message of "Supplemental Enhancement Information" type associated with a plurality of the images of the outgoing stream.

7. The method for dynamically adapting the stream encoding of claim 1, wherein the remote device applies different encoding parameters for the outgoing stream according to the state of the remote device, and wherein the first device determines the indicator(s) for adaption of the encoding of the incoming stream on the basis of the encoding characteristics of the outgoing stream.

8. The method for dynamically adapting the stream encoding of claim 1, wherein the first device comprises a dedicated power supply and an energy storage, and wherein the first device modifies the encoding characteristics of the incoming stream according to the value of said at least one indicator and the level of charge of the energy storage of the first device.

9. The method for dynamically adapting the stream encoding of claim 1, wherein the encoding of the incoming stream by the first device comprises compression encoding by (a) cutting the images into blocks, and (b) for each block, performing a transform and a quantification, and wherein the first device modifies, according to the indicator(s) of the outgoing stream, at least one parameters from among the fineness of cutting of the images into blocks, the relative proportion of blocks with spatial predictive encoding in relation to the number of blocks with temporal predictive encoding, and the level of quantification.

10. The method for dynamically adapting the stream encoding of claim 1, wherein the encoding of the incoming stream by the first device comprises filtration preprocessing and then compression encoding on the preprocessed stream, and wherein the first device modifies, according to the indicator(s) of the outgoing stream, at least one parameter from among the intensity of said preprocessing filter, the level of compression of the encoding, and the resolution of the incoming stream.

11. An encoding device for audio and/or video streams, wherein it is configured to implement the steps of the method as claimed in any one of the preceding claims that are executed by the first device.

12. A decoding device for audio and/or video streams, wherein it is configured to implement the steps of the method as claimed in claim 1 that are executed by the remote device.

13. An encoding and decoding device for audio and/or video streams, adapted of alternately implementing the steps executed by the first device in the method as claimed in claim 1 and the steps executed by the remote device in the same method.

14. A system comprising the remote device and the first device of claim 1 for implementing the method of claim 1.

15. The system of claim 14, wherein the first device and the remote device are respectively an encoding and decoding device, and wherein the first device and the remote device exchange streams whose encoding is performed locally on each of the first device and the remote device according to the constraints associated with the other of the first device or the remote device.

16. The method for dynamically adapting the stream encoding of claim 5, wherein the outgoing stream is a video stream encoded on the basis of the "MPEG4-Advanced Video Coding" standard or a standard with upward compatibility with this standard, and wherein the remote device inserts said at least one indicator into a message of "Supplemental Enhancement Information" type associated with a plurality of the images of the outgoing stream.

* * * * *